United States Patent
Muir et al.

[11] Patent Number: 6,126,197
[45] Date of Patent: Oct. 3, 2000

[54] LIGHTWEIGHT DISCOIDAL FILTERLESS AIR BAG INFLATOR

[75] Inventors: Martin J. Muir, Scottsdale; Robert S. Willhelm, Mesa, both of Ariz.

[73] Assignee: Talley Defense Systems, Inc., Mesa, Ariz.

[21] Appl. No.: 08/842,485

[22] Filed: Apr. 24, 1997

[51] Int. Cl.[7] .................................................. B60R 21/26
[52] U.S. Cl. ............................................................ 280/741
[58] Field of Search ............................................. 280/741

[56] References Cited

U.S. PATENT DOCUMENTS

| | | | |
|---|---|---|---|
| 3,758,131 | 9/1973 | Stephenson et al. | 280/150 AB |
| 3,773,352 | 11/1973 | Radke | 280/150 AB |
| 3,787,074 | 1/1974 | Lewis et al. | 280/150 AB |
| 3,930,666 | 1/1976 | Lynch et al. | 280/150 AB |
| 3,961,806 | 6/1976 | Katter | 280/732 |
| 3,985,076 | 10/1976 | Schneiter et al. | 280/741 |
| 4,213,635 | 7/1980 | Inokuchi et al. | 280/737 |
| 4,561,675 | 12/1985 | Adams et al. | 280/734 |
| 4,923,212 | 5/1990 | Cuevas | 280/736 |
| 5,016,914 | 5/1991 | Faigle et al. | 280/741 |
| 5,022,674 | 6/1991 | Frantom et al. | 280/741 |
| 5,058,921 | 10/1991 | Cuevas | 280/741 |
| 5,100,174 | 3/1992 | Jasken et al. | 280/741 |
| 5,114,179 | 5/1992 | Emery et al. | 280/741 |
| 5,139,280 | 8/1992 | Cord et al. | 280/741 |
| 5,181,697 | 1/1993 | Rumer | 267/116 |
| 5,186,491 | 2/1993 | Yoshida et al. | 280/741 |
| 5,221,109 | 6/1993 | Marchant | 280/736 |
| 5,286,054 | 2/1994 | Cuevas | 280/738 |
| 5,294,414 | 3/1994 | Brede et al. | 422/305 |
| 5,308,588 | 5/1994 | Emery et al. | 422/165 |
| 5,310,214 | 5/1994 | Cuevas | 280/729 |
| 5,346,254 | 9/1994 | Esterberg | 280/741 |
| 5,351,988 | 10/1994 | Bishop et al. | 280/737 |
| 5,364,127 | 11/1994 | Cuevas | 280/741 |
| 5,366,239 | 11/1994 | Headley | 280/728 |
| 5,398,966 | 3/1995 | Hock | 280/736 |
| 5,403,036 | 4/1995 | Zakula et al. | 280/741 |
| 5,435,594 | 7/1995 | Gille | 280/728.2 |
| 5,468,013 | 11/1995 | Gille | 280/729 |
| 5,468,017 | 11/1995 | Kirsch et al. | 280/741 |
| 5,492,365 | 2/1996 | Bayley et al. | 280/741 |
| 5,513,879 | 5/1996 | Patel et al. . | |
| 5,516,147 | 5/1996 | Clark et al. | 280/737 |
| 5,529,335 | 6/1996 | Bohmler | 280/741 |
| 5,536,040 | 7/1996 | Cuevas et al. | 280/737 |
| 5,551,725 | 9/1996 | Ludwig | 280/737 |
| 5,553,889 | 9/1996 | Hamilton et al. | 280/736 |
| 5,556,130 | 9/1996 | Fulmer | 280/741 |
| 5,556,132 | 9/1996 | Sampson . | |
| 5,558,367 | 9/1996 | Cuevas . | |
| 5,566,976 | 10/1996 | Cuevas | 280/737 |
| 5,575,499 | 11/1996 | Kohno | 280/741 |
| 5,584,506 | 12/1996 | Van Wynsberghe . | |
| 5,613,702 | 3/1997 | Goetz | 280/735 |

(List continued on next page.)

Primary Examiner—Eric Culbreth
Attorney, Agent, or Firm—Pennie & Edmonds LLP

[57] ABSTRACT

A non-hybrid pyrotechnic filterless inflator, i.e., gas generator, for an automotive passive restraint air bag having a generally discoidally-shaped pressure vessel having a diameter that preferably is greater than or about equal to its height formed of a cup-shaped closure cap and a base member and having at least one exhaust nozzle for directing gaseous products out of the inflator and into the air bag. The pressure vessel contains an initiator assembly and a gas-generant cup assembly including a stamped metal cup which contains the main pyrotechnic gas-generating propellant composition positioned about and in some embodiments in contact with the initiator assembly and preferably spaced a small distance from the walls of the pressure vessel. The initiator assembly includes an initiator plug received in the opening of the base, a standard initiator which ignites the gas-generating products or ignition-enhancing materials in the inflator and the electrical connections to connect the inflator to a crash-sensing diagnostic system. An ignition-enhancer cup assembly may be provided which includes an ignition enhancing charge material placed inside a stamped metal cup containing numerous gas ports and positioned about the initiator assembly to place the ignition-enhancing generant charge about and in contact with the initiator.

36 Claims, 3 Drawing Sheets

U.S. PATENT DOCUMENTS

| | | | |
|---|---|---|---|
| 5,621,183 | 4/1997 | Bailey | 102/207.7 |
| 5,622,380 | 4/1997 | Khandhadia et al. | 280/736 |
| 5,625,164 | 4/1997 | McFarland et al. | 102/531 |
| 5,628,528 | 5/1997 | DeSautelle et al. | 280/736 |
| 5,634,661 | 6/1997 | Dahl et al. | 280/741 |
| 5,660,412 | 8/1997 | Renfroe et al. | 280/737 |
| 5,690,357 | 11/1997 | Cuevas | 280/737 |
| 5,709,406 | 1/1998 | Buchanan | 280/737 |
| 5,725,243 | 3/1998 | Skanberg | 280/737 |
| 5,762,368 | 6/1998 | Faigle et al. | 280/737 |
| 5,779,266 | 7/1998 | Moore et al. | 280/737 |
| 5,794,973 | 8/1998 | O'Loughlin et al. | 280/737 |
| 5,799,972 | 9/1998 | Handman et al. | 280/735 |
| 5,799,973 | 9/1998 | Bauer et al. | 280/741 |
| 5,803,494 | 9/1998 | Headley | 280/741 |
| 5,836,610 | 11/1998 | Rink et al. | 280/736 |
| 5,839,754 | 11/1998 | Schlüter et al. | 280/736 |
| 5,851,027 | 12/1998 | DiGiacomo et al. | 280/736 |
| 5,863,066 | 1/1999 | Blumenthal | 280/737 |

LIGHTWEIGHT DISCOIDAL FILTERLESS AIR BAG INFLATOR

FIELD OF THE INVENTION

The invention relates to a gas-generating device or inflator suitable for rapidly inflating a flexible bag or filling a container to an elevated pressure. One example of an application of the invention is automotive passive restraint air bags in which a flexible and collapsible bag is inflated rapidly upon sudden deceleration of the vehicle in order to protect occupants from sustaining injuries.

BACKGROUND OF THE INVENTION

Rapid gas-generating devices or inflators, as they are referred to in the art, have found widespread use. One use is in passive air bag restraint systems in order to reduce the large number of deaths and injuries occurring in automobile accidents annually. Air bags and inflatable belts for passive restraint systems are operatively associated with inflator devices which are generally activated by an inertial switch or sensor which detects rapid deceleration of a vehicle such as that which occurs upon impact between an automobile and another object. When the inertial switch is triggered, it causes an inflator to inflate a collapsed flexible bag or belt quickly which is deployed into a protective position in front of the occupant. The bag or belt must inflate extremely rapidly after the primary impact or collision in order to protect the occupants from injury caused by secondary impact or collision with the interior of the vehicle. In order to meet such criteria, the bag or belt should be fully inflated within about 10–65 milliseconds after inflation has been initiated.

A variety of conflicting design considerations must be taken into account in developing an effective air bag passive restraint system. First, the inflator must be capable of producing and/or releasing a sufficient quantity of gas to the air bag within the time limitation required of a passive restraint air bag system, given the time limitation involved in air bag restraint systems, roughly about 10 to 15 milliseconds for side impact applications and 30 to 65 milliseconds for driver and front passenger applications. Inflators must be capable of filling an air bag in these time frames with 15 to 50 liters of gas for side applications and 60 to 200 liters of gas for driver and front passenger applications. The specific amount and rate of gas generation or release is determined by the required air bag volume and the vehicle structural rigidity which influences the time between primary and secondary impacts.

Other considerations in designing an inflator for a passive air bag restraint system, particularly for automotive applications, include the toxicity and noxiousness of the gas which fills the air bag. That is, the inflator for an automotive air bag must generate or release gas and other materials which meet or surpass certain non-toxicity requirements in order to protect the occupants in case the air bag ruptures, and since some air bags are designed to deflate by releasing the gas within the confines of the interior of the vehicle. Otherwise, toxic or noxious gas may injure or cause illness to the occupants. For example, the release of too much carbon monoxide could cause illness and even be deadly to the occupants. These toxicity requirements are controlled by certain specifications required by the automotive manufacturers. For example, a typical automotive requirement is that an inflatable air bag system meet certain specifications for a 100 cubic foot compartment. These toxicity specifications are set by health requirements and one reference which is helpful in defining those requirements is OSHA workplace breathing air standards. Another reference is the American Conference of Governmental Hygienists' Allowable Limits for Short Term Exposure Levels for the Workplace.

In addition, the gas-generating composition may be highly toxic or unstable requiring special handling during the manufacturing process and creating disposal problems at the end of the useful life of the vehicle. For example, raw sodium azide which is used as the gas-generating composition in most airbag inflators today has a relatively high toxicity which creates handling problems during the manufacturing process.

Other considerations include that the gas and any other materials, for example solid particles, released into the air bag must meet energy transfer restrictions so that it will not burn or deteriorate the integrity of the air bag. Insuring that the energy and materials transferred during the inflation event do not burn, puncture or deteriorate the bag, protects the occupants from injury and insures proper bag inflation.

Packaging restrictions add a further design consideration in the development of passive air bag inflators. For example, weight and size are primary factors in determining the suitability of vehicle inflator designs. Weight reduction translates into fuel economy improvements and size reduction into styling and design flexibility. For styling reasons and customer-acceptance, and so as not to interfere with the occupants' movement, comfort or the driver's line of vision, it is desirable to arrange the inflator so as not to be obtrusive, and yet have it positioned so that it effectively accomplishes its intended task. In order to accomplish these styling, customer-acceptance and engineering design parameters, the inflator must be capable of being packaged in a compact manner. For example, it is desirable to package the inflator in an air bag module which fits with the hub of the steering wheel while still allowing the use of the vehicle's horn by depressing any part of the steering wheel hub and while additionally allowing the use of the numerous control switches on the steering column. It is further advantageous for side impact bags to package the inflator and air bag module between the exterior door panel and the trim or panel in the interior of the door.

The emphasis on weight reduction for the purpose of fuel conservation in motorized vehicles, and the recent development of passenger air bags, rear-seat occupant air bags, side-impact air bags, seat-belt air bags and knee-bolster air bags as well as the contemplated use and development of air bags in the A and B pillars of vehicles and other small bags of 1 to 30 liters of volume, have created the need and demand for a light and compact inflation system.

There are basically two methods or systems which are employed to supply the gas in air bag restraint systems. In one method, the inflating gas is provided as a compressed gas stored onboard the vehicle within a pressure vessel. In the second method, the bag is inflated by igniting a pyrotechnic gas-generating propellant composition and directing the resultant gaseous combustion products into the bag. These two methods create three categories of inflators, the first relies solely upon a pressurized reservoir of gas, the second upon burning a combustible propellant to generate all of the gas to fill the air bag, the third upon a combination of the two described methods to inflate the air bag, and is known in the art as a hybrid inflator.

The first method requires a reservoir of gas stored onboard the vehicle at a very high pressure which is discharged into the bag immediately upon sensing the impact. In order to inflate the vehicle occupant restraint bag in the required time of 0.010 to 0.065 seconds, that is to attain a fill volume rate of at least about 900 liters per second and preferably approximately 3,000 liters per second, a relatively large reservoir of gas at pressures of 3,000 pounds per square inch ("psi") is stored in a pressure vessel. To open the pressure vessel in the short time interval required to inflate the air bag, explosive actuated arrangements are employed for bursting a diaphragm or cutting through a structural portion of the reservoir.

In the second method, a pyrotechnic gas generator having an ignitable and rapid-burning gas-generating propellant composition burns to produce substantial volumes of hot gaseous products which are directed into the inflatable bag. These gas generators must withstand thermal and mechanical stresses during the gas-generating process. Specifically, the gas-generating propellant ignites, combusts and burns at elevated temperatures and pressures which require the casing (pressure vessel) surrounding the gas-generant to be capable of safely withstanding these elevated pressures at a specified safety factor. These strength requirements result in a large, bulky and heavy inflator typically of toroidal shape, for driver-side applications.

Typically, there is a center chamber in these gas-generating inflators used for pyrotechnic ignition-enhancers and auto-ignition materials ("AIM"). The center chamber is concentrically surrounded by one or more separate chambers in fluid connection with each other and with the center chamber. The concentric chamber typically contains the main propellant charge and filter. Structural members divide the concentric chambers and are connected to the outer pressure vessel usually by means of a weld, rivet, screw thread or other mechanical fastening means. These structural members typically form a central post construction for the pressure vessel which adds to the strength, weight and size of the inflator.

Pyrotechnic compositions typically include a fuel and an oxidizer. Because gas-generants, including sodium azide which is used today in most passive restraint systems, and most pyrotechnic oxidizers typically produce significant amounts of solid particulates, filters are typically incorporated into the inflator to separate the hot particles from the gas prior to exhausting the inflating gas into the air bag. The solids produced during combustion are separated from the gas stream to prevent the particles from rupturing the bag and injuring occupants. In addition, as described above, it is important to produce an inflator gas having a temperature which is sufficiently low to avoid burning or deteriorating the integrity of the air bag or belt. However, gas-generants which burn faster and better at lower temperatures tend to produce significant quantities of particulates making filters all the more important when using these low temperature-burning gas-generating materials.

In addition, the filters in prior art inflators also acted as a heat sink to reduce the temperature of the gaseous products filling the air bag. The filters which are usually made from metal are helpful in absorbing the heat from the gaseous products and often provide a torturous path for the gaseous products to travel which further absorbs the energy of the gaseous products in order to protect the integrity of the air bag or belt.

The structural members forming the central post construction and filters in these gas-generating inflators add weight, complexity, cost and bulk to the inflators. For the reasons described, decreasing weight and size are desirable in the design of automotive inflators for passive air bag restraint systems. Although there have been inflator designs which have deviated from these typical designs, they still include the disadvantages of filters or central post construction or other bulky designs. For example, U.S. Pat. No. 5,556,130 describes a pyrotechnic inflator having a generally cylindrical pressure vessel formed of sheet metal which includes an annular filter having a plurality of convolutions of metal screen having decreasing mesh size as it progresses to the outside of the filter where it abuts against the pressure vessel walls. U.S. Pat. No. 4,923,212 discloses a pyrotechnic inflator having a domed pressure vessel which includes an annular filter abutting against the pressure vessel walls. In both of these patents, the filter adds to the weight, size and complexity of the inflator design.

U.S. Pat. No. 5,551,725 discloses several inflator embodiments. Two embodiments include a cylindrical tubularly-shaped pressure vessel which is relatively bulky, having a length substantially larger than its diameter and which relies on the ignition-enhancing materials being blown into the portion of the pressure vessel containing the gas-generant composition to provide quick and efficient mixing and burning with the main gas-generant. This design disadvantageously relies on a bulky, large and inconveniently shaped pressure vessel which is difficult to use in many applications and is not sized to be a drop-in replacement for existing inflators. The other embodiment of the invention disclosed in U.S. Pat. No. 5,551,725 relies on a toroidally-shaped pressure vessel having a structural central post structure which disadvantageously adds to the bulk, weight and complexity of the inflator.

The third category, the hybrid inflation system, utilizes a gas-generating propellant composition and a pressurized medium to meet the requirements of air bag restraint systems. As such, a hybrid inflator suffers many of the drawbacks of the other two categories of inflator designs, and is often of complex design. These hybrid systems typically store pressurized gas at about 3,000 psi. In operation, they burn gas-generating propellant grains to produce heated gas as well as to heat the stored gas. Hybrid inflators produce less solid particles since less solid particulate producing gas-generant can be used to obtain the same inflator gas output. In addition, the stored pressurized gas cools the gas which flows into the inflator.

The combination of greater condensation of solids within the inflator and the reduction of solids produced allows some hybrid inflators to operate without filters. Current driver-side hybrid inflators are toroidal in shape with a center chamber typically used for the hybrid heater assemblies surrounded by one or more separate chambers in fluid connection typically containing the pressurized gas. Structural members divide the concentric chambers and are connected to the outer pressure wall usually by weld, rivet, screw thread or other mechanical fastening means. Hybrid inflators have a number of drawbacks: first they are more complicated and have more parts. Second, there is higher cost associated with more parts and the additional handling and assembly operations. Third, they are larger and heavier because the inflator energy is in part stored as a pressurized gas rather than a solid and fourth, they have decreased reliability resulting from storing the pressurized gas over the lifetime of the vehicle.

OBJECTS OF THE INVENTION

It is thus an object of the present invention to provide an inflator with reduced weight, size and with fewer geometric constraints on its design and packaging. It is a further object to provide a simple, compact and light-weight inflator. It is a still further object to eliminate the need for a filter in an inflator. It is another object to provide a gas-generating inflator which eliminates or at least reduces the size of internal structural members of the pressure vessel and their attachment means. It is a further object of the invention to provide a less costly inflator both in terms of fewer parts and fewer and less costly manufacturing operations to assemble and which yet may serve as a drop-in replacement for existing toroidal driver-side air bag inflators.

SUMMARY OF THE INVENTION

These objects are achieved by the use of a non-hybrid, non-azide filterless gas-generating inflator which eliminates the structural members which typically divide the concentric chambers and which are connected to the outer pressure vessel walls in a toroidally-shaped inflator. The present invention includes a non-hybrid pyrotechnic filterless inflator, i.e., gas generator, configured and adapted to provide a sufficient amount of non-toxic, non-noxious gaseous product by the combustion of a non-azide pyrotechnic propellant composition stored within a housing (pressure vessel) for substantially inflating an automotive passive restraint air bag device in the time period between the occurrence of a primary collision between the vehicle and another object and a secondary collision occurring between the occupant(s) and the interior of the vehicle.

The inflator of the present invention includes a generally discoidally-shaped pressure vessel formed of a cup-shaped base member defining a central opening which receives an initiator assembly and a cup-shaped closure cap defining at least one exhaust nozzle for directing gaseous products out of the inflator and into the air bag. As used herein the term "discoidal" or "discoidally-shaped" when used with reference to a pressure vessel refers to a pressure vessel having a shape wherein the diameter is greater than or about equal to its height and which lacks the central post structure forming a separate central chamber that is typical of prior art toroidal pressure vessel structures. An environmental seal may be provided over the exhaust nozzle to prevent contamination of the interior components of the inflator during periods of non-use and to allow pressure to build up within the inflator upon initiation of the pyrotechnic reaction. The pressure vessel may advantageously contain a mechanical interface for connecting the inflator to the air bag module.

A gas-generant cup assembly having a stamped metal cup which contains the main pyrotechnic gas-generating propellant composition is positioned about and in some embodiments in contact with the initiator assembly and preferably spaced a small distance from the walls of the pressure vessel. The gas-generating composition is preferably a low solids producing formulation configured in the form of pellets or tablets. The gas-generant cup contains numerous openings along its walls for allowing the gaseous products produced by the combustion of the gas-generating propellant composition to escape the gas-generant cup. These openings are preferably configured to be smaller than the size and configuration of the gas-generating composition pellets. Preferably, the gas-generating cup assembly includes a spring-loaded lid to keep the gas-generating pellets from moving within the inflator which can cause disturbing rattling noises and also deterioration and crumbling of the gas propellant tablets and resulting leakage of the gas-generating composition outside of the gas-generant cup assembly. The gas-generating cup is not attached to the closure cap and forms no structural part of the pressure vessel but acts as a receptacle to position the gas-generating composition about the initiator assembly. The initiator assembly includes an initiator plug received in the central opening in the base member, a standard initiator which ignites the gas-generating products or ignition-enhancing materials in the inflator and electrical connections to connect the initiator to a crash-sensing diagnostic system.

In an alternate embodiment, the inflator also may contain an enhancer cup assembly which includes a stamped metal cup defining numerous gas ports about its walls and an ignition-enhancing charge material placed inside the cup. The gas ports in the cup are sealed with a burst foil to prevent migration of the ignition-enhancing charge and to allow a build up of pressure within the enhancer cup before burst of the foil seal. The enhancer cup is positioned about the initiator assembly to place the ignition-enhancing charge about and in contact with the initiator. The ignition-enhancing material provides sufficient heat and pressure to ignite the main gas-generating composition and is preferably a fast-burning, low solids-producing formulation. The enhancer cup is not attached to the closure cap and forms no structural part of the pressure vessel of the inflator. In this embodiment, the gas-generating cup assembly is positioned concentrically about the enhancer cup assembly.

In another embodiment, the inflator also may contain an AIM ("auto-ignition materials") assembly to provide safe ignition of the main gas-generating composition of the inflator when it is subject to a bonfire environment. The AIM assembly includes AIM powder packaged in a thin metal cup containing a seal. The AIM assembly can be used in conjunction with or alternatively without the enhancer cup assembly. The AIM cup is preferably in abutting relationship with at least one wall of the pressure vessel.

The advantages of the present inflator design are a smaller package with a simpler, lighter and less costly design. The lower cost of the gas-generating inflator of the invention is achieved through the elimination of or lighter weight internal structural hardware and their attachments. The lower cost is achieved also by eliminating the filter typically found in most gas-generating inflators. The lower cost of the inflator of the invention is achieved also because fewer and less costly manufacturing operations are required to assemble the inflator. The invention is advantageous also because of its smaller, more compact size. The size advantage also is achieved by eliminating the filter and by eliminating or reducing the heft, strength and bulk of any internally fastened structural center post components thereby resulting in a lighter, smaller inflator.

DETAILED DESCRIPTION OF THE INVENTION

Figure 1:
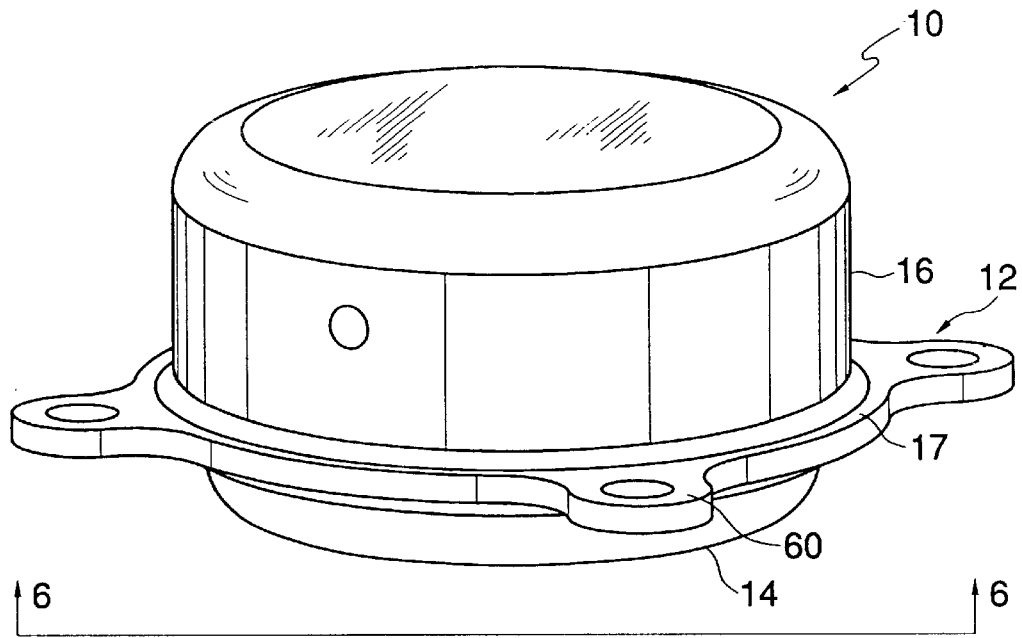
FIG. 1 is a perspective view of the inflator of the invention.

Reference will now be made in detail to the embodiments and methods of the invention as illustrated in the accompanying drawings. In the drawings, like reference characters designate like or corresponding parts throughout the drawings.

The following description and illustration is generally of the preferred embodiment of the invention and is provided only to illustrate various specific configurations and an application of the present invention. Reference is made generally to FIGS. 1–6 in which reference numerals in the various embodiments differing by amounts of 100, for example 12, 112, 212, 312, refer to similar elements unless otherwise referenced in the specification. This description relates generally to an inflator for a driver's side air bag. The inflator may be used for other automotive passive restraint air bag or belt systems. In addition, the air bag application of the inflator of the present invention is only illustrative and the inflator may be used in many other applications such as evacuation slides, flotation devices, rafts, etc., and many modifications and variations on the illustrated embodiments may be made without departing from the spirit and scope of the invention.

FIG. 1 illustrates the pyrotechnic, non-hybrid filterless inflator of the invention in the form of a vehicle passive restraint air bag inflator 10 suitable for application as the inflator for a driver's-side air bag unit of approximately 60 liters. Such an air bag unit is located typically in a housing (not shown) in the hub of the steering column of the vehicle with an inflator mounted in the housing and coupled in fluid communication with a deflated and stored air bag (not shown).

Figure 6:
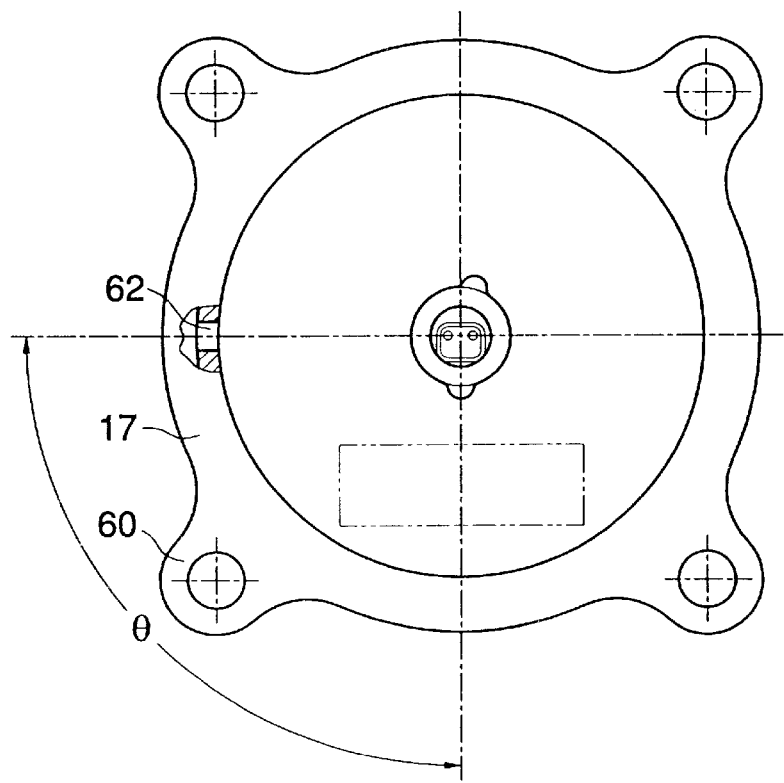
FIG. 6 is a bottom plan view of the inflator taken along line 6—6 of FIG. 1.
Figure 2:
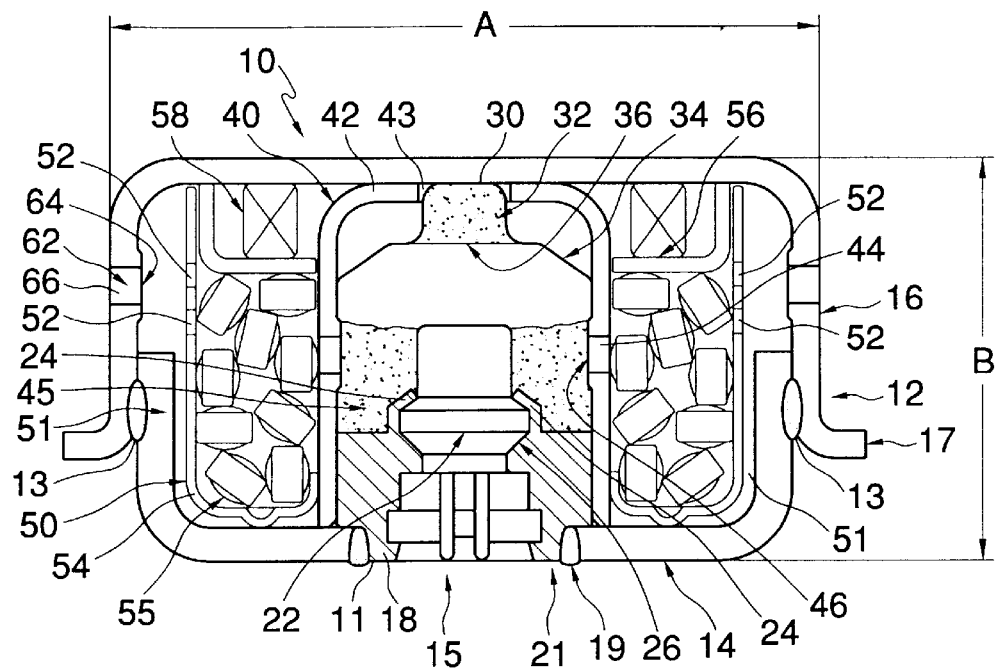
FIG. 2 is a cross-sectional view of the inflator of the invention.

Referring to FIGS. 1, 2, and 6 inflator 10 includes a pressure vessel 12 having a base member 14 formed of a stamped metal cup welded at 13 to a closure cap 16. Closure cap 16 may contain an integral flange 17 on its open end to serve as the mechanical interface for connection to the air bag module (not shown). In this regard, flange 17 has mounting means 60 which in this case is four through-holes defined in the flange which are adapted and configured to receive fastening means, such as for example, a bolt or rivet, to attach the inflator to the housing in the steering column.

Preferably, and for illustrative purposes, the pressure vessel 12 is discoidal in shape having a diameter A of approximately 2.4 inches and a height B of approximately 1.4 inches and is configured to replace standard toroidal design inflators used in current driver-side air bag modules. Preferably, the base member 14 is 0.120 inch thick Nitronic® (200 series) stainless steel while the closure cap 16 is 0.093 inch thick Nitronic® (200 series) stainless steel. Normal operating pressures of the exemplary preferred inflator are in the range of 5,000 to 10,000 psi over the operating temperature range of −35° C. to +85° C.

The center of the base member 14 defines an opening 11 which is fitted with an initiator assembly 15. Initiator assembly 15 includes an initiator plug 18, an initiator 22 and shorting clip assembly (not shown) to connect the inflator to a crash-sensing diagnostic system (not shown). The initiator plug 18 preferably is welded at 19 to the base member 14 but may otherwise be connected and sealed to the base member 14 by other known or equivalent means. The base member or metal cup 14 and initiator plug 18 form a base assembly 21.

The initiator plug 18 contains a flange 24 configured and adapted to retain a standard automotive initiator 22. The initiator plug 18 orients and interfaces with the initiator's shorting clip assembly (not shown) and the initiator 22, which is a dual pin electrical interface configured to connect to a standard inflator connector (not shown). The initiator 22 is a standard automotive inflator component manufactured by various suppliers. The initiator converts the electrical signal received from the vehicle's crash-sensing diagnostic system (not shown) into a pyrotechnic output through the use of a bridgewire in a manner well-known to those skilled in the art. The standard initiator 22 along with an initiator seal 26 is held in the initiator plug 18 by crimping flange 24. The initiator seal 26 helps form a gas-tight seal between the initiator 22 and the initiator plug 18.

The inflator of the present invention preferably contains auto-ignition materials ("AIM"). AIM minimizes the risk of inflator over-pressurization in the event of exposure to unintended external heating, such as for example a fire, by igniting and then setting off the main charge at a temperature low enough to allow the inflator to operate as intended. The AIM is packaged inside the inflator to provide safe ignition of the internal components when subjected to a bonfire environment. The AIM cup assembly 30 includes AIM powder 32 packaged preferably into a thin stamped metal cup 34 having, for example, a Mylar® seal 36. Thin metal cup 34 may be formed, for example, of about 0.005 to about 0.015 inches thick 300 series stainless steel. The material and thickness of metal cup 34 is not critical so long as it is inert to the materials used in the inflator and can hold and keep the AIM powder 32 separated in the inflator.

The AIM cup assembly 30 preferably is press-fitted onto the enhancer cup assembly 40 which includes a stamped generally U-shaped metal container 42 referred to as the enhancer container and an ignition-enhancing charge 45. The metal container 42 may be about 0.060 inches thick 300 series stainless steel. The enhancer container 42 has a central through-hole 43 to accommodate the AIM cup assembly 30. Container 42 also has gas ports 44 formed in its side walls and preferably may have eight gas ports each having a diameter of approximately one-eight of an inch. After pressing the AIM cup assembly into the enhancer container 42, a thin burst foil 46 approximately 0.001 inches thick and preferably formed of metal, for example such as copper, is placed over the gas ports 44 to form a powder seal. An ignition-enhancing charge 45 is added to the container 42 and the container is press-fitted over the initiator plug 18. The container 42 positions the ignition-enhancing charge 45 around and in contact with the output end of the initiator 22 to aid in ignition transfer. Enhancer container 42 is not connected to the closure cap 16 and forms no structural part of the pressure vessel. Since the enhancer container 42 forms no structural part of the pressure vessel 12, its thickness and material composition are not critical so long as it positions the ignition-enhancer material 45 about the initiator 22 and is relatively inert with the inflator components.

The ignition-enhancing charge 45 provides enough heat and pressure to ignite the main gas-generating propellant charge. The ignition-enhancing charge 45 is preferably a fast-burning, low solids-producing formulation such as, for example, one of the formulations described in U.S. patent application Ser. No. 08/706,198, filed Aug. 30, 1996 which is incorporated herein by reference. As used herein, the terms "low solids" and "low level of solids" mean that upon combustion the ignition enhancing charge or gas-generant charge produces substantially lower solids than ignition enhancing charges or gas-generant charges used in prior art inflators, which produce about 60 percent solids upon combustion. The ignition-enhancing charge and gas-generant charge of the present invention preferably produce less than about 15 percent solids upon combustion.

Approximately 1.5 to approximately 2.5 grams of material having a formula of about 30.0 weight percent (wt. %)

quanidine nitrate ($CH_6N_4O_3$); about 21.3 wt. % ammonium perchlorate; about 16.2 wt. % sodium nitrate; about 32.3% hexahydro-1,3,5-trinitro-1,3,5-triazine (RDX) and about 0.2 wt. % silicon dioxide, for example, has been demonstrated to be successful as an ignition-enhancing material and is thus a preferred ignition-enhancing material. The enhancer material may be in powder, tablet, pellet or other form and is preferably in granular form. The thin metal burst foil 46 may be formed of any suitably inert material which will not react with the inflator components. The burst foil 46 serves to maintain the ignition-enhancing material 45 in the container 42 and allows pressure to build up in the enhancer container 42 prior to rupturing. After ignition of the ignition-enhancing material 45, heat and gas are generated in the enhancer container 42 which causes rupture of the burst foil 46 covering the eight gas ports 44 thereby releasing gases into the cavity containing the main propellant charge material. The gases produced by the ignition-enhancing material are of sufficient quantity and temperature to ignite the main propellant charge.

A gas-generant cup assembly 50 is positioned around the enhancer cup assembly 40 and includes a gas-generant cup 54 and gas-generant charge 55. The gas-generant cup 54 may be press-fitted onto the enhancer cup assembly 40 and may, for example, be a thin stamped metal cup with numerous small gas ports 52 in the side walls around the perimeter of cup 54 to allow gas to escape while retaining the gas-generant charge 55 within cup 54 during combustion. The gas-generant cup 54 is not attached to the closure cap 16 and forms no structural part of the pressure vessel 12. The thickness and material of the gas-generant cup 54 is not critical so long as it is inert to the inflator components and encloses and separates the gas-generant charge 55 and positions the gas-generant materials about the enhancer assembly and/or initiator. Stainless steel (300 series) having a thickness of about 0.020 to about 0.040 inches has been successfully used for the gas-generant cup.

The gas-generating composition is a non-azide formulation and preferably is a low solids-producing gas-generating composition such as those described in U.S. patent application Ser. No. 08/706,198 filed Aug. 30, 1996 which is incorporated herein by reference. In the embodiment of FIG. 2, preferably approximately 10 to approximately 25 grams of gas-generant pressed into pellet form having a formula of about 58.5 wt. % quanidine nitrate; about 23.5 wt. % ammonium perchlorate; about 17.8 wt. % sodium nitrate and about 0.2 wt. % sodium dioxide has been successful in producing substantially non-toxic, non-noxious gas at a rate and with enough volume to fill a driver's-side air bag within the required time limitations to protect a vehicle occupant and without damaging the integrity of the air bag itself. This composition is disclosed only for purposes of illustration however and does not limit the invention in any way for use with a variety of other gas-generant compositions.

The gas-generant charge 55 may be liquid, powder, granular or pressed into pellet, tablet or any other form to provide the required mass generation rate for specific vehicle applications. The quantity and configuration of gas-generant charge 55 can be varied to meet different requirements. The main propellant gases exit the gas-generant cup 54 through the gas ports 52. The gas ports 52 are preferably designed to be smaller than the gas-generant charge 55 to prevent the gas-generant charge from leaving the cup 54. In some embodiments, the gas ports 52 may be sealed by a foil for example. In the preferred design, there are ninety (90) gas ports 52 each 0.085 inch in diameter located in two rows around the perimeter of the cup 54. The large number of gas ports 52 and resulting flow area are configured to minimize pressure drop across the main charge cup 54 during operation.

The gas-generant 55 is added to the generant cup 54 and a stamped metal lid 56 is placed over the gas-generant 55 and held in place by a standard steel spring or wave washer 58. The lid 56 keeps the main gas-generant in place during handling of the inflator and prevents any noise or gas-generant pellet rattle which could occur as a result of settling of the gas-generant 55 and/or movement of the inflator.

The gas-generant cup 54 preferably is positioned to provide an air gap 51 between the pressure vessel 12 and the gas-generant cup 54. The air gap 51 provides insulation for the gas-generant in the event the inflator 10 is subjected to the effects of a fire. The air gap 51 and AIM cup assembly ensures that the unit does not malfunction and over pressurize during a fire. The air gap 51 becomes more important with the use of lower melting point gas-generant materials.

More specifically, the AIM material is designed to ignite at a temperature which is lower than the temperature at which the strength of the material out of which the pressure vessel is formed begins to deteriorate or at which the other energetic materials begin to decompose, melt or otherwise deteriorate. The AIM material thereafter ignites the ignition-enhancing material and/or the main gas-generating charge to initiate the inflator. By igniting the AIM material before the strength of the pressure vessel deteriorates, the potential problem of the inflator attaining a pressure which exceeds the strength of the pressure vessel, creating the risk of the pressure vessel over pressurizing and injuring people and property, is avoided.

The closure cap 16 is a stamped metal cup which is provided with flange 17 and mounting means 60 for the inflator with fasteners such as bolts, screws or rivets. Cap 16 defines a plurality of exhaust nozzles 62 configured and adapted to direct gases out of the inflator and into the air bag. The preferred design has two exhaust nozzles 62 each having a diameter of approximately 0.1 to approximately 0.15 inches. The inner aspect of exhaust nozzles 62 is covered prior to use with a thin foil burst membrane 64 preferably being approximately 0.001 inches thick copper foil.

The closure cap 16 is press-fitted onto the base member 14 whereupon it contacts the AIM cup assembly 30 and is welded at 13 to form the pressure vessel 12. The enhancer container 42 and generant cup 54 are not however, as noted above, attached structurally to the closure cap 16. Room temperature vulcanizing sealant (RTV) or another sealant 66 is then added to the nozzles 62 to provide in combination with burst membrane 64 an environmental seal and an anti-tamper barrier and to allow a build up of pressure in the inflator prior to rupture.

Inflator 10 does not require a filter which typically is used to separate the hot gas-generant particles from entering the air bag with the combustion gases and thus eliminates this bulky, space-consuming and heavy feature and its associated manufacturing and part cost. This is due mainly to use of non-azide clean-burning gas-generant, not to the construction of inflator 10. Upon rupture, the inflator gases flow into the air bag, pressurizing the airbag volume to extend the bag and provide occupant impact protection.

Figure 3:
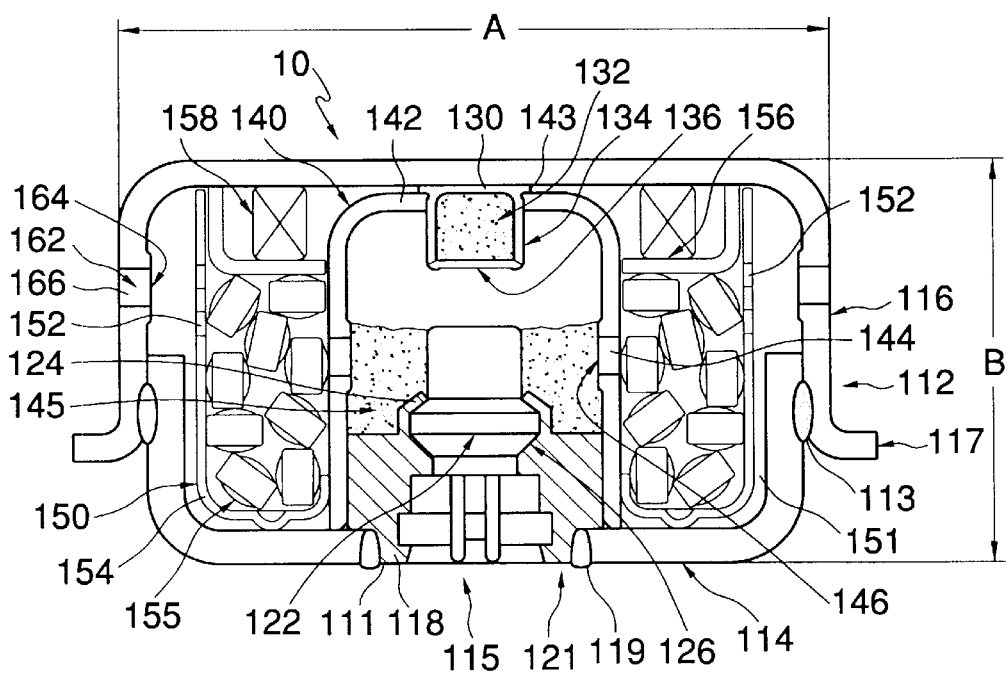
FIG. 3 is a cross-sectional view of an alternate embodiment of the inflator of FIG. 1.

The configuration and design of the embodiment of inflator 10 illustrated in FIG. 3 is similar in most aspects to the embodiment shown in FIG. 2 except that the FIG. 3 embodiment utilizes an alternative assembly method and design for the enhancer container 142 and AIM assembly 130. As shown in FIG. 3, the enhancer container 142 is pressed onto the initiator assembly and the enhancer material 145 is loaded through the top of the enhancer container through hole 143. A different AIM cup assembly 130 is incorporated including of a metal AIM cartridge 134 (similar to a pistol or rifle blank) having AIM material 132 held in place by a crimped in-place seal 136. Assembly 130 may be pressed into the top through-hole 143 of the enhancer cup 142. The AIM cup assembly 130 is further secured in place when the closure cap 116 is pressed onto the base member 114. This embodiment may offer manufacturing advantages in the area of pyrotechnic handling.

Figure 4:
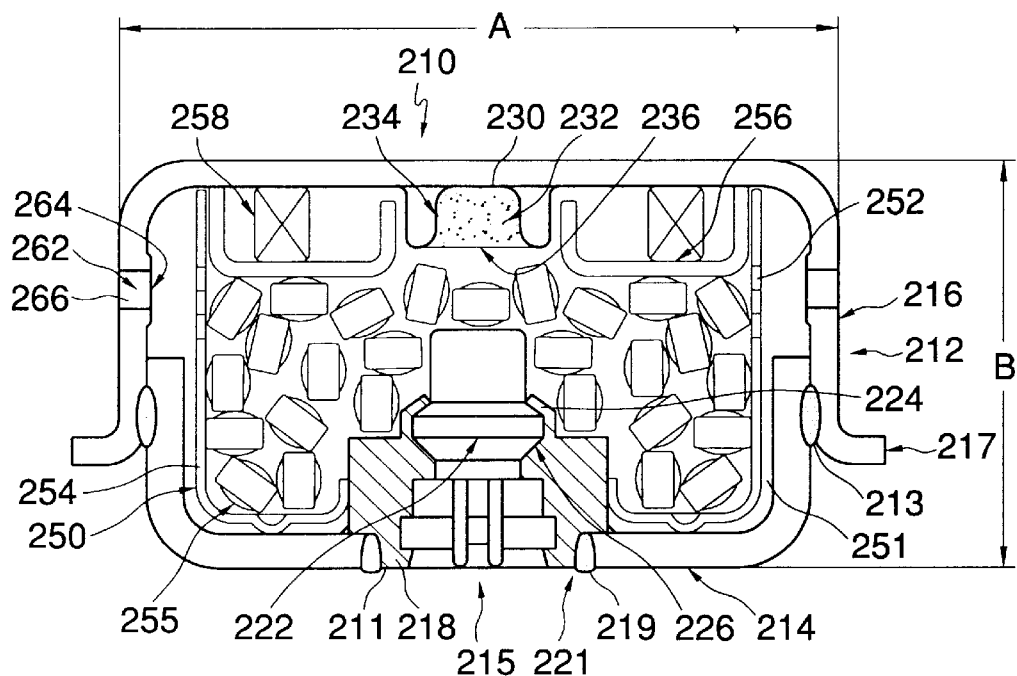
FIG. 4 is a cross-sectional view of another alternate embodiment of the inflator of FIG. 1.

The embodiment of FIG. 4 is similar in construction to FIGS. 2 and 3 but reduces the number of parts required to form the inflator 10 by eliminating the enhancer assembly 40, 140. In FIG. 4, the gas-generant cup 254 is pressed onto the initiator assembly 215. Gas-generant material 255, in this case in the form of pellets, is added to the gas-generant cup 254. Gas-generant lid 256 and spring 258 are placed over the gas-generant material 255. AIM cup assembly 230, including AIM cup 234, AIM material 232 and AIM seal 236 may be attached to closure cap 216 or held in place by lid 256. AIM assembly 230 is in contact with the closure cup 216 in assembled form.

Figure 5:
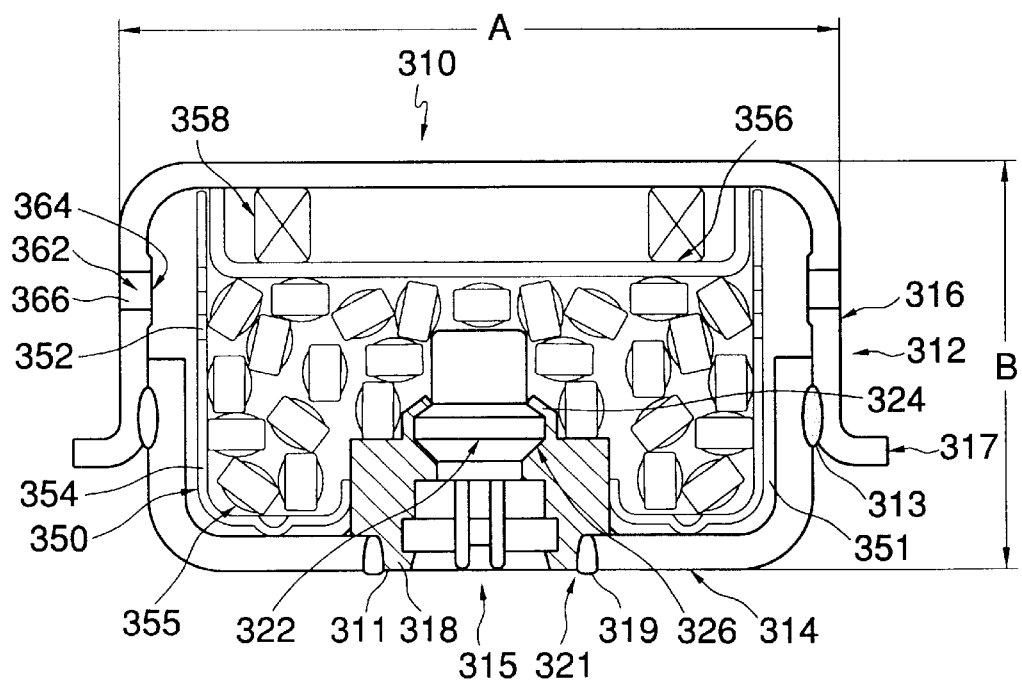
FIG. 5 is a cross-sectional view of a still further embodiment of the inflator of FIG. 1.

The embodiment of FIG. 5 is similar in configuration to the embodiment of FIG. 4 but offers a further reduction in the number of parts by eliminating the AIM cup assembly. In FIG. 5, the gas-generant cup 350 is pressed onto the initiator assembly 315. Gas-generant material 355 is added to the gas-generant cup 354 and the gas-generant lid 356 is placed over the gas-generant material 355 and retained by spring 358. The designs of FIGS. 4 and 5 simplify the design resulting in lower cost, both in terms of manufacturing and part cost, and reduced weight.

FIG. 6 illustrates the mounting means 60 and flange 17. Prior to forming weld 13, the exhaust nozzles 62 preferably are oriented as illustrated in FIG. 6 with angle θ in the range of approximately 88–92°.

Operation of the inflator will be described with reference to FIGS. 2 and 3, it being realized that similar reactions and sequence of events take place in the inflators of FIGS. 4 and 5. Operation of inflator 10 is initiated by an electrical signal received from the vehicle crash-sensing diagnostic system (not shown). This signal is transmitted to the inflator initiator through a dual pin electrical interface. A standard automotive initiator is used to convert the electrical signal into a pyrotechnic output which is used to ignite the ignition-enhancing charge 45 which is positioned about the initiator. The ignition-enhancing charge is a fast-burning, low solids-producing formulation which combusts to form heat and pressure sufficient to burst the 0.001 inch thick copper foil 46, 146 covering the eight gas ports 44, 144.

Upon rupture of the foil 46, 146, the combustion gases from the ignition-enhancing material are released into the gas-generant cup cavity with sufficient temperature and pressure to ignite the main gas-generant charge (e.g., 55 in FIG. 2). The gaseous product from the main generant charge 55 passes through the numerous holes 52 in the gas-generant container 54 and fills the remaining volume (gap 51) of the inflator. Sufficient pressure builds in the pressure vessel to rupture the foil 64 and sealant 66 barrier and the inflator gases flow into and expand the air bag.

In the embodiments of FIGS. 4 and 5, the initiator 222, 322 is used to ignite the main gas-generant charge 255, 355 which is positioned about the initiator 222, 322. The gaseous products from the main generant charge 255, 355 pass through the numerous holes 252, 352 in the gas-generant cup 254, 354 and fill the remaining volume of the inflator. Sufficient pressure builds in the pressure vessel 212, 312 to rupture foil 264, 364 and sealant barrier 266, 366 and the inflator gases flow out of exhaust nozzles 262, 362.

Inflator performance can be tailored by changing the generant composition, amount, configuration and/or the diameter of the exhaust nozzle 62, 162, 262, 362. The thickness of the gas-generant cup 54, 154, 254, 354 and enhancer container 40, 140 are not critical since they do not attach to the closure cap 16, 116, 216, 316 or form structural members of the pressure vessel 12, 112, 212, 312. The thickness of the AIM cup 34, 134, 234 is also not critical since it also forms no structural part of the pressure vessel 12, 112, 212. The generant cup, AIM cup and enhancer container separate and enclose their respective materials but do not form a structural feature of the assembled inflator particularly not a structural feature of the pressure vessel.

Additional modifications and advantages will readily occur to those skilled in the art and the invention is not limited to the specific details and representative devices shown and described. For example, other gas-generating compositions and enhancer compositions may be used as well as a variety of materials and construction techniques. Moreover, the pressure vessel may have other shapes which do not include a central post structure. Accordingly, departures may be made from the details and examples shown without departing from the spirit or scope of the general inventive concept as defined by the appended claims and their equivalents.

We claim:

1. A method of assembling an inflator comprising:
   (a) providing a substantially cup-shaped base member having first and second ends, the base member open at the first end and defining in the second end an aperture configured and adapted for insertion therein of the initiator assembly;
   (b) installing the initiator assembly adapted for effecting combustion of a pyrotechnic material into the aperture of the second end of the base member;
   (c) positioning a gas-generant container comprising a gas-generating composition and a gas-generant cup configured and adapted for containing the gas-generating composition in surrounding relation to the initiator assembly; and
   (d) closing the base member first end by sealing thereover a closure cap, said closure cap secured to the base member; and
   (e) press-fitting the gas-generant cup in surrounding relation to the initiator assembly.

2. The method of claim 1 further comprising welding an initiator plug to the base member.

3. The method of claim 2 further comprising positioning an ignition-enhancer container comprising an enhancer cup containing an ignition enhancing material in surrounding relation to the initiator plug, and placing the gas-generating cup in surrounding relation to the ignition-enhancer cup.

4. The method of claim 3 wherein the enhancer cup is press-fitted over the initiator plug.

5. The method of claim 4 further comprising press-fitting an auto-ignitor into the enhancer cup, the auto-ignitor comprising an auto-ignition container having first and second ends, the first end having an opening, an auto-ignition material placed in the auto-ignition container and a seal covering the opening.

6. A pyrotechnic inflator comprising:
(a) a substantially discoidally-shaped pressure vessel consisting essentially of a base member having first and second ends, said base member open at said first end and defining, in said second end, an aperture configured and adapted for insertion therein of an initiator assembly, and a closure cap closing said base member first end, said pressure vessel defining at least one exhaust nozzle adapted to permit passage of gaseous combustion products rendered within said inflator out of said pressure vessel, wherein said pressure vessel is free of internal structural members;
(b) the initiator assembly adapted for effecting combustion within said pressure vessel of a pyrotechnic gas-generating material, said initiator assembly received within the aperture in said base member second end and extending therefrom into said pressure vessel;
(c) a gas-generant container located within said pressure vessel and positioned adjacent said initiator assembly, configured for containing a pyrotechnic gas-generating composition and adapted to expose said pyrotechnic gas-generating composition to an effect of said initiator assembly upon activation of said initiator assembly; and
(d) an auto-ignitor abutting the pressure vessel, said auto-ignitor adapted for igniting the gas-generating composition at a temperature lower than ignition temperature of the gas-generating composition; wherein the inflator is filterless.

7. The inflator of claim 6 wherein the auto-ignitor comprises a container having first and second ends, said first end defining an opening adapted for at least partially filling said auto-ignitor with all auto-ignition material, an auto-ignition material located within said container and a seal for closing the opening in the container first end.

8. The inflator of claim 7 wherein the inflator is other than a hybrid inflator, and the gas-generating composition is free of azide containing gas-generants and produces a gaseous product upon combustion having a solids level of less than 60%.

9. The inflator of claim 8 wherein the initiator assembly comprises an initiator adapted for producing energy to ignite the gas-generating composition within said gas-generant container, an initiator plug received in the aperture in the base member and adapted to retain the initiator in position in said pressure vessel second end, a seal between the initiator and the initiator plug to provide a substantially pressure-tight fit between the initiator and the pressure vessel and means for connecting the initiator to a control system for controlling operation of said initiator.

10. The inflator of claim 8 wherein said gas-generating composition comprises guanidine nitrate, and an oxidizer comprising a mixture of ammonium perchlorate and sodium nitrate.

11. The inflator of claim 10 comprising from 54 to about 67 percent guanidine nitrate and from about 33 to about 46 percent oxidizer wherein the oxidizer comprises ammonium perchlorate and sodium nitrate in a mole ratio of about 1 mole of ammonium perchlorate to about 1 to about 4 moles of sodium nitrate.

12. The inflator of claim 11 wherein the gas-generating composition comprises about 55–65 percent guanidine nitrate, about 20–25 percent ammonium perchlorate and about 15–20 percent sodium nitrate.

13. The inflator of claim 12 wherein the gas-generating composition comprises about 59 percent guanidine nitrate, about 23 percent ammonium perchlorate and about 18 percent sodium nitrate.

14. The inflator of claim 13 comprising from about 10 to about 25 grams of said gas-generating composition.

15. The inflator of claim 6 wherein the gas-generant container is free from attachment to the closure cap and comprises a substantially cup-shaped container defining, in a side wall portion thereof, a plurality of openings adapted to allow passage of a gaseous product produced upon combustion of said gas-generating composition out of said gas-generant container.

16. The inflator of claim 15 wherein the gas-generant container is positioned in substantially surrounding relation to the initiator assembly.

17. The inflator of claim 16 wherein the gas-generating composition is in the form of pellets and the openings in the container are smaller than the pellets.

18. The inflator of claim 17 wherein the gas-generant container further comprises a spring-loaded lid adapted nor closing an open end of said substantially cup-shaped container and for substantially preventing the pellets from moving within the gas-generant container.

19. The inflator of claim 16 wherein the gas-generant container is positioned at a distance removed from the base member and closure cap such that a gap is formed between the gas-generant container and the pressure vessel to provide a thermal insulating barrier.

20. The inflator of claim 19 further comprising an ignition-enhancing material adjacent said initiator assembly, said ignition-enhancing material igniting upon activation of said initiator assembly to enhance combustion of the pyrotechnic gas-generating composition.

21. The inflator of claim 20 further comprising an ignition-enhancing material container comprising an enhancer cup, said cup adapted for containing said ignition enhancing material and positioned in surrounding relation to the initiator assembly.

22. The inflator of claim 21 wherein the enhancer cup comprises a base portion, a side wall portion and a plurality of gas ports defined by said side wall portion, said ports substantially sealed with a burst foil adapted to burst open upon activation of said inflator.

23. The inflator of claim 6 wherein the diameter of the pressure vessel is less than about 2.5 inches and the height is less than about 1.5 inches.

24. A pyrotechnic air bag inflator capable of producing and exhausting a sufficient volume of gas into an air bag operatively associated therewith to inflate said air bag within a time interval between a primary and a secondary collision and without damaging the integrity of the air bag, said inflator comprising:
(a) a substantially discoidally-shaped pressure vessel consisting essentially of a cup-shaped base member having first and second ends, said base member open at said first end and defining in said second end an aperture configured and adapted for receiving an initiator assembly, and a closure cap covering said base member first end, said pressure vessel defining at least one exhaust nozzle adapted to permit passage of gaseous combustion products produced within said inflator out of said pressure vessel, wherein said pressure vessel is free of internal structural members;
(b) a gas-generating composition free of azide containing gas-generants which generates a gaseous product upon combustion;
(c) the initiator assembly adapted for effecting combustion of the gas-generating composition within the pressure vessel, the initiator assembly received in the aperture in the base member second end and extending therefrom into said pressure vessel, said initiator assembly comprising an initiator adapted for producing energy to ignite the gas-generating composition, an initiator plug received in the aperture of the base member and adapted to retain the initiator in position in said pressure vessel, a seal between the initiator and the initiator plug to provide a substantially pressure-tight fit between the initiator and the pressure vessel and means for connecting the initiator to a crash-sensing diagnostic system; and (d) a gas-generant container within said pressure vessel positioned adjacent said initiator assembly and configured for containing an amount of a gas-generating composition said gas-generant container is adapted to expose said gas-generating composition to the effect of said initiator upon activation of said initiator assembly and said gas-generant container is free from attachment to the closure cap;

(e) the gas-generant container comprises a substantially cup-shaped metal container having an open end and a closed end defining in a side wall portion thereof a plurality of openings adapted to allow passage of a gaseous product produced within said container upon combustion of said gas-generating composition out of said gas-generant container and a spring-loaded lid adapted for closing the open end of said cup-shaped metal container and for substantially preventing the gas-generating composition from moving within said gas-generant container;

wherein the inflator is filterless.

25. The inflator of claim 24 wherein the diameter of the pressure vessel is less than about 2.5 inches and the height is less than about 1.5 inches.

26. The inflator of claim 24 wherein the gas-generating composition is in a form and size which prevents the gas-generant composition from fitting through the openings in the side wall portion of the gas-generant container.

27. The inflator of claim 24 wherein the gas-generant container has greater than about 24 openings, each with a diameter of at least about 0.085 inches, in its side wall.

28. The inflator of claim 24 containing from about 10 to about 25 grams of gas-generating composition comprising about 55 to 60 weight percent quanidine nitrate, about 20–25 weight percent ammonium perchlorate and about 15–20 weight percent sodium nitrate.

29. The inflator of claim 24 further comprising an auto-ignitor abutting the pressure vessel, said auto-ignitor adapted for igniting the gas-generating composition at a temperature lower than a combustion temperature of the gas-generating composition.

30. The inflator of claim 29 wherein the auto-ignitor comprises a container having first and second ends, said first end defining an opening adapted for at least partially filling said auto-ignitor with an auto-ignition material, an auto-ignition material located within said container and a seal for closing the opening in the container first end.

31. The inflator of claim 24 wherein the gas-generant container is positioned at a distance removed from the base member and closure cap such that a gap is formed between the gas-generant container and the pressure vessel to provide a thermal insulating barrier.

32. The inflator of claim 24 further comprising an ignition-enhancing material adjacent said initiator for igniting upon activation of said initiator and enhancing the combustion of the gas-generating composition.

33. The inflator of claim 32 further comprising an ignition-enhancing material container comprising an enhancer cup having a base portion, a side wall portion and a plurality of gas ports defined in said side wall, said enhancer cup is free from attachment to the closure calm still enhancer cup adapted for containing and positioning said ignition-enhancing material in surrounding relation to the initiator assembly.

34. The inflator of claim 33 wherein the enhancer cup gas ports are substantially sealed with foil adapted to burst open upon activation of said inflator.

35. The inflator of claim 24 further comprising an expandable envelope attached thereto in operative relation therewith and adapted to retain at least temporarily the gaseous products released from at least one said exhaust nozzle.

36. A pyrotechnic inflator comprising:

(a) a substantially discoidally-shaped pressure vessel consisting essentially of a base member having first and second ends, said base member open at said first end and defining, in said second end, an aperture configured and adapted for insertion therein of an initiator assembly, and a closure cap closing said base member first end, said pressure vessel defining at least one exhaust nozzle adapted to permit passage of gaseous combustion products rendered within said inflator out of said pressure vessel, wherein said pressure vessel is free of internal structural members;

(b) the initiator assembly adapted for effecting combustion within said pressure vessel of a pyrotechnic gas-generating material, said initiator received within the aperture in said base member second end and extending therefrom into said pressure vessel; and (c) a gas-generant container located within said pressure vessel, free from attachment to the closure cap, positioned in substantially surrounding relation to the initiator assembly and configured for containing a pyrotechnic gas-generating composition and adapted to expose said pyrotechnic gas-generating composition to an effect of said initiator assembly upon activation of said initiator assembly, the gas-generant container comprising:

(i) a substantially cup-shaped container defining, in a side wall portion thereof, a plurality of openings adapted to allow passage of a gaseous product produced upon combustion of said gas-generating composition out of said gas-generant container; and (ii) a spring-loaded lid adapted for closing an open end of said substantially cup-shaped container and for substantially preventing the pellets from moving within the gas-generant container;

wherein the gas-generating composition is in the form of pellets and the openings in the container are smaller than the pellets, and the inflator is filterless.

* * * * *

UNITED STATES PATENT AND TRADEMARK OFFICE
CERTIFICATE OF CORRECTION

PATENT NO. : 6,126,197
DATED : October 3, 2000
INVENTOR(S) : Muir, et al.

Page 1 of 1

It is certified that error appears in the above-identified patent and that said Letters Patent is hereby corrected as shown below:

Column 13,
Line 32, claim 7, Line 4, change "all" to --an--.

Column 14,
Line 17, claim 18, line 2, change "nor" to --for--.

Column 16,
Line 9, claim 33, line 5, change "calm still" to --cap, said--.

Signed and Sealed this

Third Day of July, 2001

*Attest:*

Nicholas P. Godici

*Attesting Officer*

NICHOLAS P. GODICI
*Acting Director of the United States Patent and Trademark Office*